Sept. 21, 1965  H. E. HOLMAN ETAL  3,207,835
RHYTHM DEVICE
Filed April 14, 1961  5 Sheets-Sheet 1
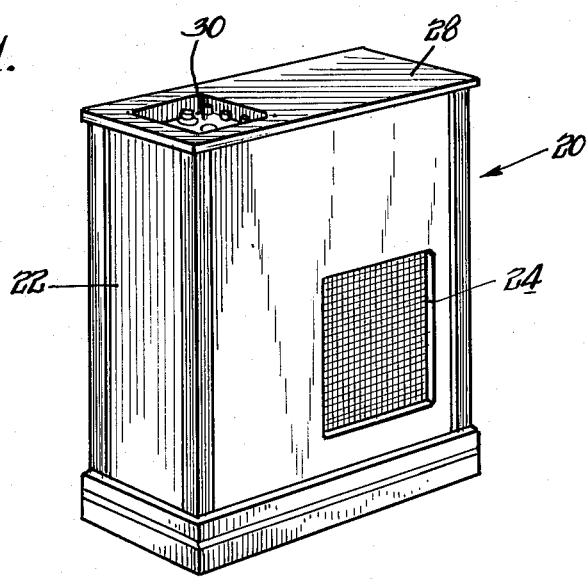
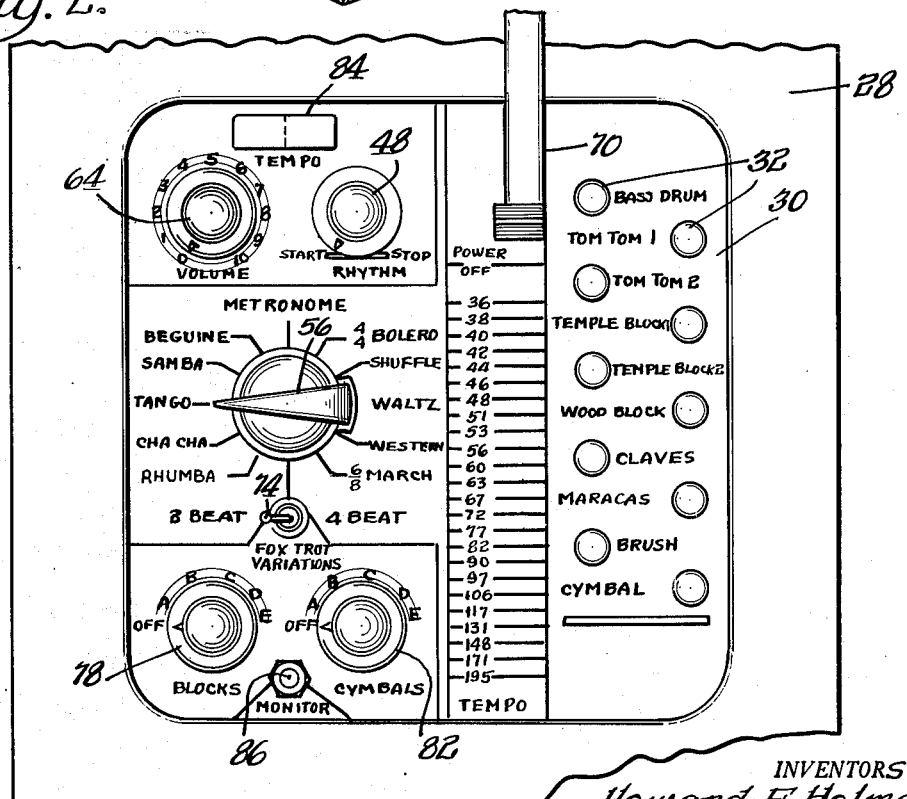
INVENTORS
Howard E. Holman
Joseph H. Hearne
Marvin C. Korinke
By: Olson & Trexler attys.

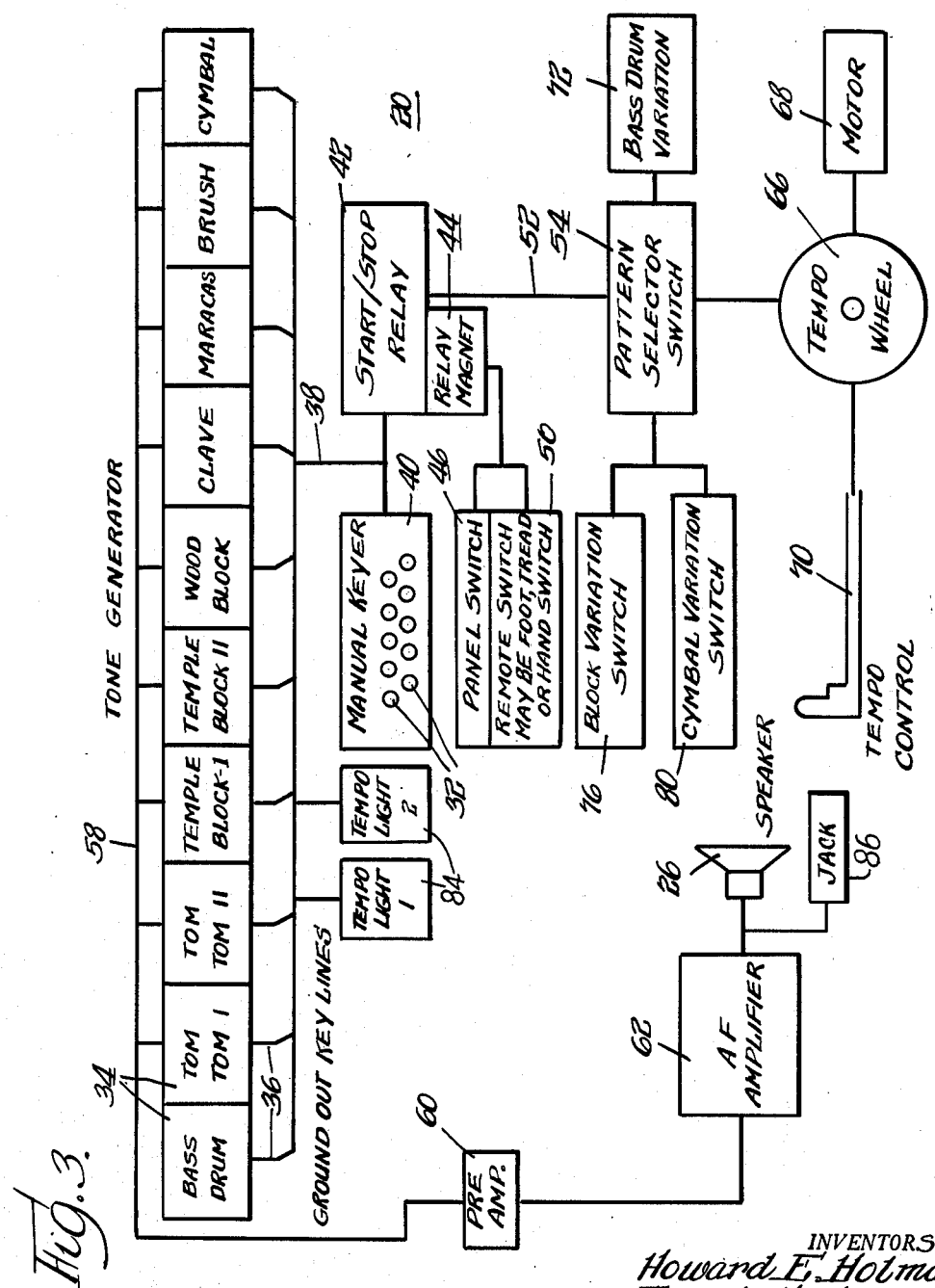

INVENTORS
Howard E. Holman
Joseph H. Hearne
Marvin C. Korinke
By: Olson & Trexler attys.

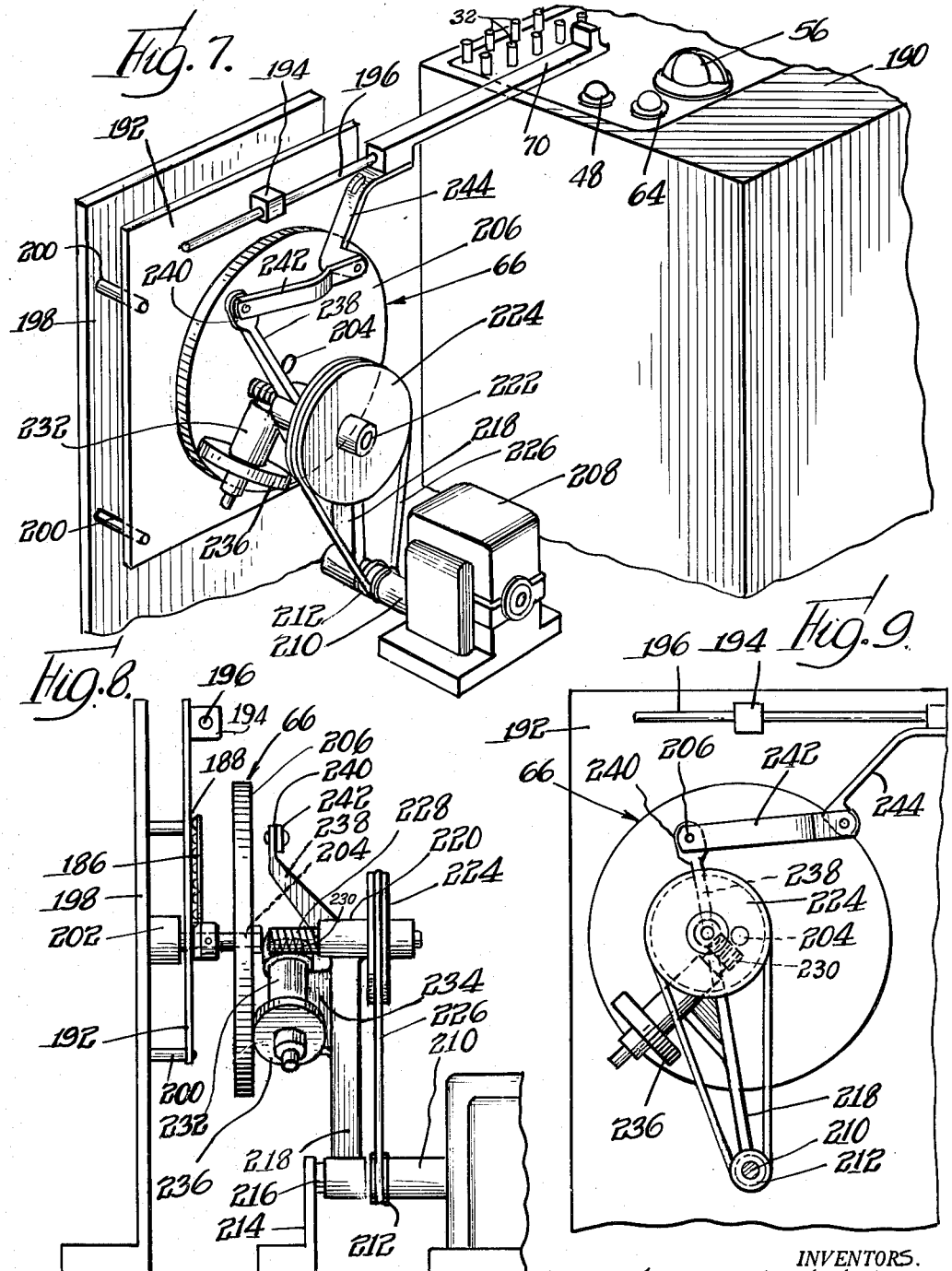

United States Patent Office 3,207,835
Patented Sept. 21, 1965

3,207,835
RHYTHM DEVICE
Howard E. Holman and Joseph H. Hearne, Corinth, and Marvin C. Korinke, Jackson, Miss., assignors to The Wurlitzer Company, Chicago, Ill., a corporation of Ohio
Filed Apr. 14, 1961, Ser. No. 103,001
15 Claims. (Cl. 84—1.03)

This invention is concerned generally with the art of synthetic music generation, and particularly with a rhythm device for producing percussive type tones to accompany a melody instrument, for example, an electronic organ.

As is well known, it is common practice for various cafes, night clubs, and the like to provide music, as a background for dining and the like, and also for dancing. For economic considerations, it is often necessary to limit music production to a single performer. Such a performer may often play upon an electronic organ, which probably provides the greatest range of possible effects in a single instrument. However, there is a limit to how much a single performer can do, even with a versatile, modern electronic organ. Specifically, if adequate rhythm effects are to be produced to lend zest to dancing, and to satisfy the modern taste requiring a "beat," it is necessary or desirable to provide a rhythm accompaniment of one or more percussive device with the melody as played on the main instrument. In many instances, the cost of one or more musicians with percussive instruments to accompany the melody instrument is prohibitive. In fact, in many instances, even the performer for the melody instrument will not be provided, due to the assumed inadequacy of a single instrument, and the undue cost of providing two or more performers.

Students are faced with the problem of learning to play a melody instrument which normally will have a rhythm or percussive accompaniment. Obviously, it is not practical for a student to enlist the services of one or more percussive instrumentalists each time he wants to practice.

Furthermore, it is an object of this invention to provide apparatus for electronically producing percussive tones selectively in sequence, and simulating a wide variety of well-known percussive tone generators.

A further object of this invention is to provide switching means in an electronic percussive tone generator for allowing selective production of a wide variety of different rhythms and combinations of tone generators.

It is yet another object of this invention to provide an electronic rhythm generator having an infinitely variable, wide range of speed adjustment.

Yet another object of this invention is to provide an electronic rhythm percussive tone generator as heretofore outlined, which is entirely self contained.

Other and further objects and advantages of the present invention will be apparent from the following description when taken in connection with the accompanying drawings wherein:

FIG. 1 is a perspective view of an electronic rhythm device as constructed in accordance with the principles of this invention;

FIG. 2 is an enlarged detail plan view of the control panel thereof;

FIG. 3 is a block diagram of the components of the rhythm device;

FIG. 7 is a perspective view of a part of the device, particularly showing the drive mechanism for the commutator or repetitive switch of FIG. 6;

FIG. 8 is an enlarged end view thereof; and

FIG. 9 is an enlarged profile view thereof.

Figure 4:
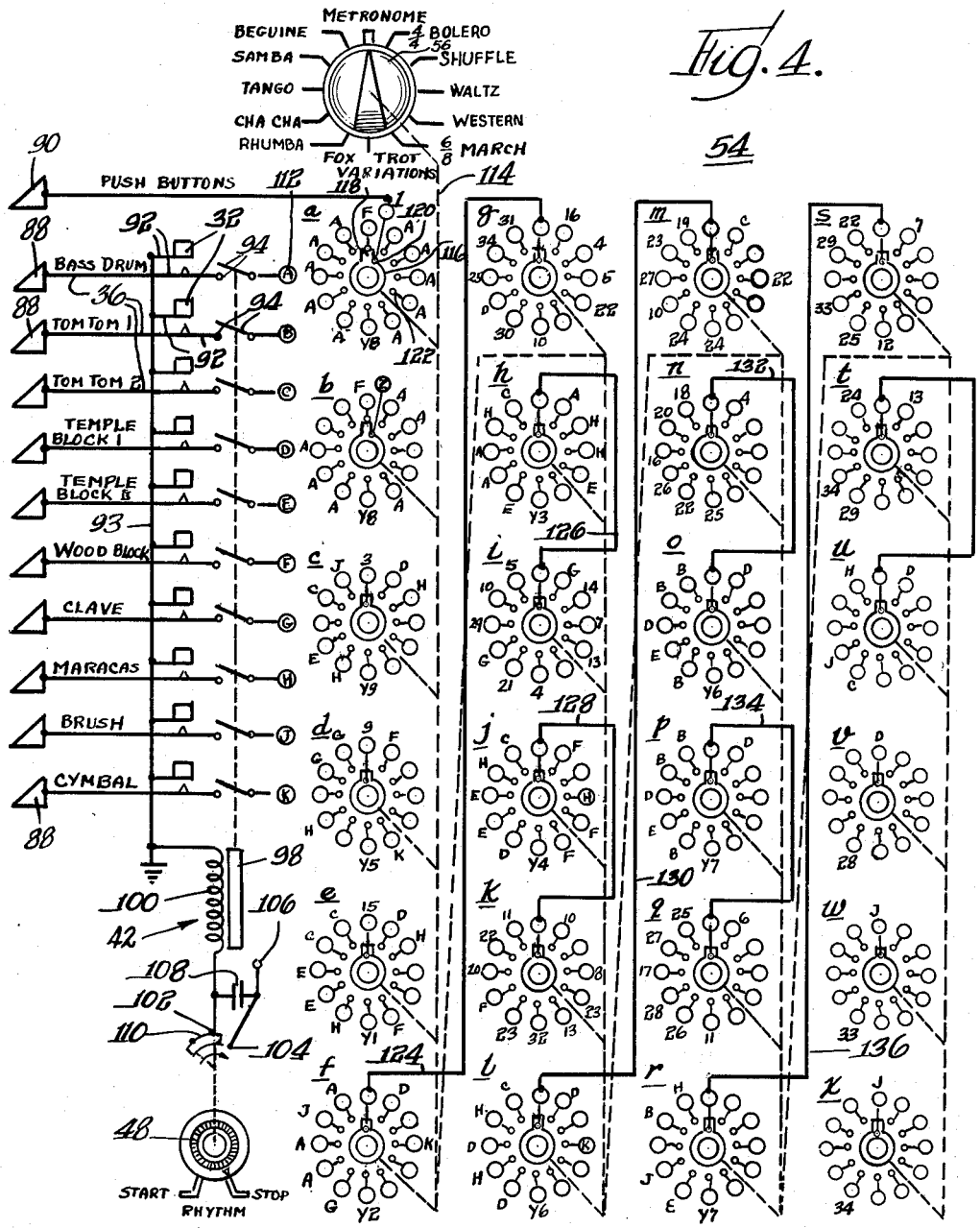
FIG. 4 is a partial schematic diagram showing the switching of the device for setting up different combinations of percussive tones.

Referring now in greater particularity to the drawings, and first to FIGS. 1–3, there will be seen a rhythm device designated generally by the numeral 20, and including a case or cabinet 22. The cabinet is conveniently and preferably finished on four sides and the top, and is provided on one of the sides with an opening and grill cloth 24 covering a loud speaker 26. The top panel 28 of the cabinet is provided near one end thereof with a recess in which is mounted a control panel 30. The control panel is provided along one side with a plurality of push buttons 32 for individually controlling the various tones generators 34, as hereinafter will be set forth. These tone generators, by way of example, and as shown on FIG. 3 and next to the push-buttons on FIG. 2, include a bass drum, two sets of tom-toms, one of slightly higher frequency than the other, two sets of temple blocks, a wood block, claves, maracas, brush, and cymbal. As will be appreciated, other percussive type tone generators could be provided. Specific tone generators are disclosed in the copending application of Joseph H. Hearne, filed March 16, 1961, Ser. No. 96,135, entitled, "Rhythm Device." The various tone generators 34 preferably are of a type which either produce no output unless keyed, or which produce an output which is blocked, unless keyed. Specifically, the various tone generators from the bass drum through the claves, as disclosed in the aforesaid copending application, comprise damped, blocked oscillators, which are not operative until a particular bias point therein is grounded out, as through the various ground out key lines 36, connected by a cable 38 direct to a manual keyer 40, including the push buttons 32. The cable 38 also is connected to a start/stop relay 42, to be disclosed more fully hereinafter, controlled by a relay magnet 44, which is alternatively controlled by a panel switch 46 operated by a knob 48 (FIG. 2), or by a remote switch 50, which may be a foot, tread or hand switch. Connection is made through the start/stop relay 42 as indicated by the line 52 (FIG. 3) to a pattern selector switch 54, hereinafter to be disclosed in detail. The pattern selector switch 54 is controlled by a knob 56 on the panel 30, for selecting various rhythms, such as waltz, fox trot, rhumba, and the like, all as clearly labeled in FIG. 2.

The tone generators are connected to a collector line 58 leading to a preamplifier 60. The preamplifier is, in turn, connected to an audio-frequency amplifier 62 driving the speaker 26. A volume control is indicated at 64 in FIG. 2, and is conventionally connected to the input of the audio-frequency amplifier 62.

The tones may be played in any desired manner manually by depressing the keys 32 with the fingers. The tone sources 34 from the bass drum through the claves, in FIG. 3, are "one-shot" in nature. That is to say, when a key is depressed, the corresponding percussive sound will be produced once. The maracas, brush, and cymbal tone generators 34, on the other hand, comprise a continuous tone or electrical oscillation source coupled through blocked amplifiers. Accordingly, when the push-button corresponding to one of these is depressed, the corresponding tone will sound continuously, until the key or push-button is released.

When the tones are to be used in any particular rhythm, as those indicated in FIG. 2 under the influence of the control knob 56, combinations are established as will be disclosed more fully hereinafter. The pattern selector switch has associated therewith a tempo wheel 66 driven at an infinitely variable speed by a motor 68. The specific speed is controlled by a tempo control lever 70 (FIGS. 2 and 3), which has associated therewith a power on-off switch for the motor 68, and for the various tone generators. The lever must be drawn out past the "power off" line indicated in FIG. 2 for the tone generators and the motor to be operative.

In addition to the foregoing, when the knob 56 is turned to select the fox trot rhythm, i.e., the lowermost position in FIG. 2, further variations are available. Thus, there is a bass drum variation 72 comprising a toggle switch 74 to produce a two-beat or a four-beat variation. In addition, there is an off plus five position block variation switch 76 controlled by a knob 78, and a cymbal variation switch 80 controlled by a knob 82.

In addition to this, there is a two-segment tempo light 84, the left side of which flashes to indicate the first beat or start of a rhythm pattern, and the right side of which flashes on the accented (bass drum) beats within the pattern. Finally, at the bottom of the panel 30, there is provided a monitor jack 86, to allow one to listen to the rhythm device with earphones, with the volume turned down to the point where there is no audible sound output from the loudspeaker 26.

Referring now to FIG. 4, and first to the left hand side of the figure, there will be seen a series of triangles 88 comprising the various keying points in the tone generators. A similar triangle 90 is provided indicating a keying point for one of the tempo light sections. As indicated previously, each tone generator preferably is of a type which is rendered active upon grounding out of the particular keying point. To this end, each push button controls a switch 92, one side of which is connected to a common ground line 93. The opposite side of the switch, conveniently the fixed side, in each instance is connected to the corresponding wire 36 leading to the respective generator, for example, the bass drum, the tom-tom 1, the tom-tom 2 generator, etc. In addition, each line 36 is connected, as through the fixed switch contact, to a set of normally open relay contacts 94. All of the relay contacts are controlled in common by relay 42 comprising an armature 98 and a coil 100, one side of which is grounded. The opposite side of the relay coil 100 is connected to a fixed switch terminal 102 which is spaced from another fixed switch terminal 104, the latter being connected to a point 106 comprising a source of direct current potential. A noise suppression capacitor 108 bridges the terminals 102 and 104, and a movable shorting element or contact bar 110 is arranged for control by the knob 48 to bridge the contacts 102, 104. In FIG. 4, the rhythm control is shown in off position. When the knob 48 is rotated clockwise so that the arrow thereon moves from the "stop" position to the "start" position, the shorting bar 110 is moved into position to connect the contacts 102 and 104, whereby to apply direct current potential to the relay coil 100, thereby to attract the armature 98 and thereby to close all of the relay contacts 94.

The sides of the respective contacts 94 opposite the wires 36 are respectively connected to terminals 112 respectively labeled A–K. The connections of these terminals will be set forth shortly hereinafter.

The pattern selector switch 54, as shown in FIG. 4, comprises a plurality of stacked wafer switches respectively labeled a–x, all operated by a common shaft 114 on which the knob 56 is fixed. Each wafer switch comprises, see wafer a, a rotatable contactor having a slip ring portion 116 and a radially extending contact arm 118. A contactor or brush 120 rides on the slip ring 116 and is connected to a numbered terminal. In the case of wafer a, the numbered terminal is spaced above and to the right, being identified by the numeral 1. In addition, there are twelve fixed contacts 122 equally arcuately spaced about the ring 116 and spaced outwardly therefrom, being individually and respectively engageable by the contact arm 118. Each of the fixed contacts 122 is respectively connected to a fixed terminal identified by a letter. Thus, in connection with wafer a, starting with the one o'clock position and proceeding clockwise, we find the following indicia: A, A, A, A, A, YB, A, A, A, A, A, and F.

It will be noted that the letter indicia vary from one wafer to another, and that there are sometimes numeral indicia, rather than letters. In some instances, there are no indicia whatsoever, and it will be understood that these are simply blank terminals with nothing connected thereto. In some instances, as in wafers A and B, the terminal connected to the slip ring contact comprises a thirteenth contact. However, in most instances it is the terminal in the twelve o'clock position that is connected to the slip ring contact.

There is a certain amount of inter-wiring between the slip ring terminals, as is indicated. Thus, there is a wire leading from the twelve o'clock terminal of wafer f to the twelve o'clock terminal of wafer g, such wire being identified as 124. Similarly, a wire 126 interconnects the twelve o'clock terminals of wafers h and i. The wire 128 connects the twelve o'clock terminals of wafers j and k, a wire 130 interconnects the twelve o'clock terminals of wafers l and m, a wire 132 interconnects the twelve o'clock terminals of wafers n and o, a wire 134 interconnects the twelve o'clock terminals of wafers p and q, and a wire 136 interconnects the twelve o'clock terminals of wafers r and s.

Figure 5:
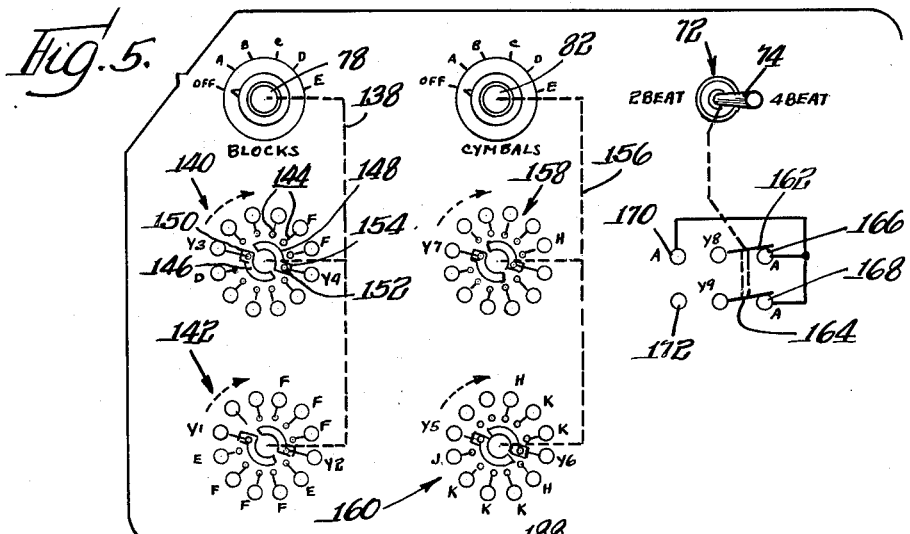
FIG. 5 is a partial schematic switching diagram to be considered in connection with FIGS. 4 and 6, illustrating further switching of the device.
Figure 6:
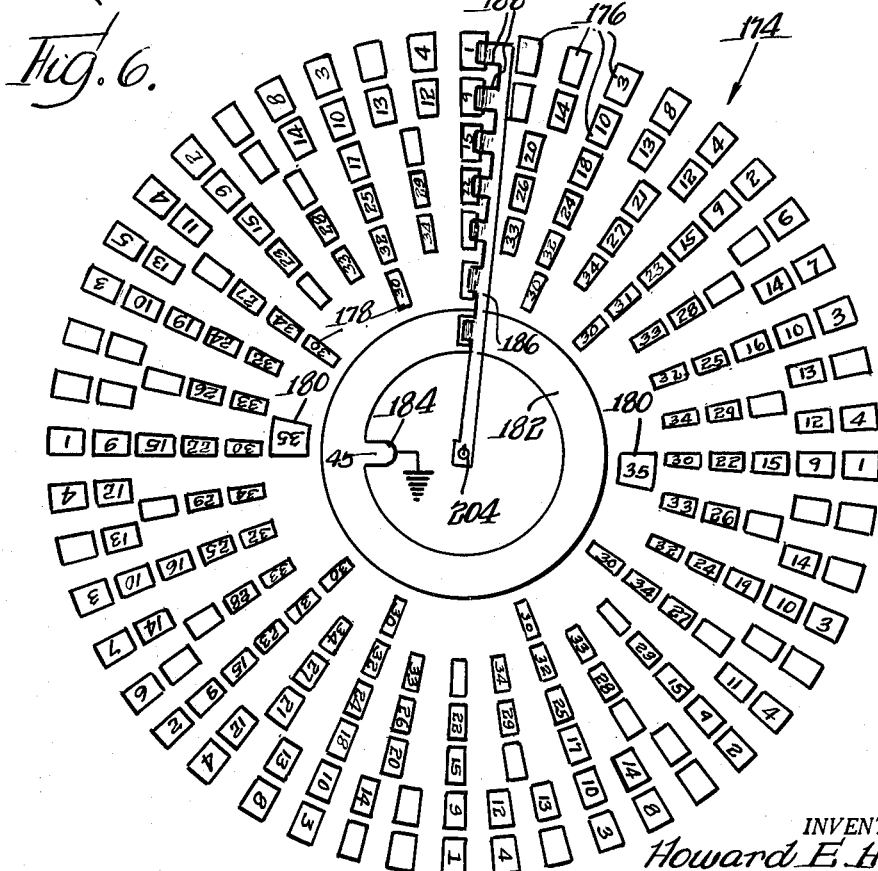
FIG. 6 is a somewhat schematic view of the commutator or repetitive switching device used in conjunction with the switching of FIGS. 4 and 5.

Before referring further to the connections of the switch wafer contacts of FIG. 4, reference should be had to FIGS. 5 and 6. FIG. 5 shows the possibe variation of the blocks, and of the cymbals, as well as the bass drum variation 72 including the toggle switch 74. The block knob 78 is fixed on a shaft schematically indicated at 138, and arranged to turn the rotatable element of a pair of switch wafers 140 and 142. The switch wafers each include twelve fixed contacts 144 respectively connected to terminals. Some of the terminals are not connected, and others, as indicated by letter designations, are connected in the manner hereinafter set forth. Each rotatable or movable switch element includes a pair of semi-circular slip rings 146 and 148, respectively having radially extending switch arms 150 and 152 selectively engageable with the fixed contacts 144. Two of the lettered terminals, rather than being connected to fixed switch contacts, are connected to brushes 154 respectively riding on the semi-circular slip rings.

The knob 82 is fixed on the shaft 156 which turns the movable or rotatable elements of a pair of switch wafers 158 and 160. These switch wafers are of identical construction with the wafers 140 and 142, and further discussion therefore is believed to be unnecessary. The toggle switch 74 of the two-beat and four-beat bass drum variation comprises a part of a double pole-double throw switch having an upper movable switch arm 162 and a lower movable switch arm 164 ganged therewith. On the right hand side, as illustrated in FIG. 5, both fixed contacts 166 and 168 are indicated as A and are wired directly to the upper left fixed contact 170, also indicated as A. The lower left contact 172 is not connected.

FIG. 6 comprises a representation of a commutator 174, which may be considered as being a part of the pattern selector switch 54. The commutator includes a fixed insulating board or the like base (not shown) carrying a plurality of conductive tabs thereon arranged in a series of rings. The outer two rings each include forty-eight conductive tabs 176. Some of the tabs are provided with numbers, to be explained shortly in connection with the wiring. Others are left blank, and are not connected. The next three circles or rings, namely numbers 3–5 counting in, each include thirty-two equally arcuately spaced contact tabs or patches 176, while the sixth ring in comprises eight relatively small contact patches 178 which are not equally arcuately spaced, but which are positioned in accordance with a predetermined pattern. In addition, the sixth ring includes two relatively larger contact patches 180 disposed diametrically opposite of one another. Finally, there is a continuous ring 182 having a wired connection 184, specifically connected to ground.

In addition to the foregoing parts, the commutator 174 includes a radially disposed arm 186 having a plurality of trailing fingers or tabs 188 respectively arranged individually to engage the contacts of the six rings of contacts or tabs, and also to engage the grounded continuous ring 182.

FIGS. 4, 5 and 6 should now be considered together. All of the similarly numbered terminals and contacts are wired together. Also, all of the similarly lettered terminals are wired together. It is not proposed to explain each switch position in detail, as this should be obvious at this point to one skilled in the art. However, by way of example, in FIG. 4 the selector knob 56 is shown in the twelve o'clock or "metronome" position. In switch wafer *a* the radial contact arm 118 engages the fixed contact connected to the terminal F. This terminal, in turn, is connected to the terminal F leading to the wood block tone generator. In addition, the slip ring portion 116 in the switch wafer *a* is connected to terminal 1, and this is connected to the triangle 90 leading to one half of the tempo light 84. Terminal 1 of switch wafer *a* in FIG. 4 is also connected to contact 1 in each position of FIG. 6, namely in the outer ring at the three o'clock, six o'clock, nine o'clock and twelve o'clock positions. Thus, four times for each revolution of the arm 186 the wood block will sound and the side of the tempo light indicating the first beat or start of a rhythm pattern will flash. In switch wafer *b* the slip ring is connected to terminal 2, and the radially projecting arm engages the fixed contact in the twelve o'clock position, connected to terminal *f*, and hence to the wood block. Hence, each time one of the fingers 188 of the arm 186 engages a contact patch 2 on the commutator 174, the wood block sounds. Thus, it will be seen that in the metronome position, the wood block sound is produced as a metronome effect eight times for each revolution of the arm 186.

In all of the other switch wafers, namely *c–x*, the twelve o'clock position contact is the one bearing on the slip ring. Since the movable switch arm is also in the twelve o'clock position, no contact is made from one terminal to another through any of these switch wafers.

In the fox trot position, with the knob 56 pointed down, additional connections are made through the terminals having the initial letter Y followed by a numeral, and the block and cymbal controls 78 and 82 can be varied to determine the number of block and cymbal sounds that will be produced. Furthermore, the toggle switch 74 can be thrown to one side or the other to produce a two-beat or a four-beat drum pattern, all as will be obvious.

The summary of the switching pattern is set forth hereunder:

| | | | |
|---|---|---|---|
| Rhumba | A-1-2<br>B-22-26<br>C-25-29<br>D-23-24-28<br>E-21<br>G-30<br>H-3-15<br>J-33-34 | Beguine | A-1-31<br>B-18-25<br>C-5-11-15-19<br>G-9<br>H-22-24<br>J-3 |
| Cha-Cha | A-D-G-1-2<br>E-F-3-15-26-28<br>H-9-10<br>J-33-34 | Metronome | F-1-2 |
| | | $^4_4$Bolero | A-G-1-2-16<br>C-D-3-4-6-7-13-15<br>F-9-10 |
| Tango | A-1-2-25-29<br>D-16-17-27<br>E-15-20 | Shuffle | A-1-2<br>H-3-4-14-15 |
| | | Waltz | A-1<br>H-5-7-8<br>K-22 |
| Samba | A-1<br>B-20-27-29<br>C-3-15<br>G-9<br>H-10-22-23<br>J-34 | Western | A-1<br>D-22<br>E-13<br>F-23 |
| | | $^6_8$March | A-1-2<br>F-13-15<br>K-9 |

| | | | |
|---|---|---|---|
| Fox Trot | Y1-15<br>Y2-10<br>Y3-4<br>Y4-32<br>Y5-9<br>Y6-24-25<br>Y7-11-12<br>Y8-1-2<br>Y9-3 | Blocks | A E-Y2<br>B F-Y2<br>C F-Y1-Y2<br>D F-Y1-Y2-Y3<br>E E-Y2<br>F-Y1-Y3<br>D-Y4 |
| | | Cymbals | A H-Y6<br>B K-Y6<br>C H-Y5<br>K-Y6<br>D K-Y5<br>K-Y6<br>E K-Y5<br>J-Y6<br>H-Y7 |
| | | 2 Beat | A-Y8 |
| | | 4 Beat | A-Y8-Y9 |

Reference now should be had to FIGS. 7–9. In these figures, there is shown a box-like interior portion 190 of the rhythm device in which are mounted the amplifiers, loud speaker, and many of the electrical connections. A vertical panel 192 extends from this box-like portion parallel to the lever 70, and is provided with a journal 194 in which a rod 196 forming an extension of the lever reciprocates. The panel 192 preferably comprises an insulating sheet, as a fiberboard or the like, on which the fixed contact patches 176, 178 and 180 and ring 182 of the commutator 174 are formed. This panel is supported from a back wall 198, by suitable means such as posts or spacers 200. A bearing 202 is mounted on the wall 198, and rotatably journals a shaft 204 on which the arm 186 is fixed. In addition, a large disc or wheel 66 is fixed on the end of this shaft and has a flat outer face or surface 206 facing away from the plate 192 and wall 198.

A motor and speed reducer unit 208 is positioned beyond the disc 66, and the output shaft 210 thereof carries a small pulley 212. A fixture 214 is provided with a shaft 216 aligned with the shaft 210, and pivotally supports a more or less upright arm 218. The arm 218 is provided with a boss 220 in which is journaled a shaft 222. A relatively large pulley 224 is fixed on the end of the shaft in the plane of the pulley 212 and with a drive belt 226 drivingly interconnecting the two pulleys.

The opposite end of the shaft 222 is provided with a worm 228 meshing with a worm gear 230 on a shaft journaled in a boss 232 on a bracket 234 on the arm 218. The oposite end of this shaft is provided with a drive wheel or roller 236. While this drive wheel may be made of any suitable material, a synthetic rubber material has been found satisfactory, since it has adequate frictional driving characteristics in engagement with the face of the wheel 66, which preferably is metal, and has resistance to atmospheric deterioration, and abrasion.

The arm 218 extends upwards above the boss 220, and projects in toward the wheel 206 as is indicated at 238. At its upper end, the arm is provided with an upright ear 240 to which is pivotally connected a connecting rod or link 242. The opposite end of this link is pivotally connected to a downwardly projecting arm or bracket 244 on the underside of the tempo adjustment lever or slide 70.

The pulley 212 on the output shaft of the motor and speed reducer 208 turns at constant speed, and acts through the belt 226 and pulley 224, and also the worm 228 and gear 230 to drive the rubber-tired wheel 236 at a constant speed. As the tempo lever or slide 70 is moved in and out, the wheel 236 is moved in and out generally radially of the tempo wheel 66, and hence engages the flat face 206 thereof at radially different positions, whereby to drive the tempo wheel 206 at different speeds over a wide and infinitely adjustable range, whereby to sweep the arm 186 across the patches or contacts or segments of the commutator 174 at an adjustable rate. The two contacts 180 (FIG. 6) numbered 35 are wired directly into the electronic circuit of the device to cause one half of the tempo light 84 to blink each time the arm passes one of these contacts. Thus, there are two beats or light winks from each of these contacts for every revolution of the arm 186, thus indicating the first beat or start of a rhythm pattern. The other half of the tempo light, through the connection indicated at 90 in FIG. 4, flashes on the accented beats within the pattern. By use of the tempo light, the player may start the rhythm of the device as he starts playing or to add the rhythm, at the right beat, while playing, without introducing any audible sound while he is getting ready.

There has now been disclosed an elctro-mechanical device for synthetically or electronically producing rhythm patterns, whereby a performer may augment the melody which he may play on another instrument, or whereby the student may have the accompaniment necessary for proper development of his own talents. The rhythm may be in accordance with any of a large number of predetermined patterns and have an infinitely variable speed over a large range, or the rhythm may be produced manually in the manner which a player may choose to improvise or otherwise provide.

The specific example of the invention as herein shown and described is for illustrative purposes only. Various changes in structure will no doubt occur to those skilled in the art, and will be understood as forming a part of this invention insofar as they fall within the spirit and scope of the appended claims.

The invention is claimed as follows:

1. An electronic musical device for producing a rhythm accompaniment or the like comprising a housing, a plurality of characteristically different electronic generating means in said housing for electronically generating a plurality of characteristically different electric oscillations corresponding to a plurality of musical tones of different character, electro-acoustic translating means interconnected with said generating means for converting said oscillations into audible musical tones, repetitive switch means enclosed within said housing and interconnected with said generating means, and cyclically repetitive switch operating means permanently mounted in and enclosed within said housing and operatively connected to said repetitive switch means to operate said repetitive switch means in a repeating cycle for sequentially rendering said generating means effective to produce a predetermined sequence of different audible musical tones from said electro-acoustic means, said repetitive switch operating means including means permanently mounted within said housing and extending therefrom for varying the rate of repetition.

2. An electronic musical device as set forth in claim 1 and further including means interconnected with said repetitive switch means and extending externally of said housing for manually establishing a predetermined sequence.

3. An electronic musical device as set forth in claim 1 for producing percussive rhythm accompaniment or the like, wherein each switch means closes only momentarily to render the generating means effective to produce audible percussive musical tones from said electro-acoustic means.

4. An electronic musical device for producing a rhythm accompaniment or the like comprising a housing, a plurality of characteristically different electronic generating means in said housing for electronically generating a plurality of characteristically different electric oscillations corresponding to a plurality of musical tones of respectively different character, electro-acoustic translating means interconnected with said generating means for converting said oscillations into audible musical tones, repetitive switch means enclosed within in said housing and interconnected with said generating means, cyclically repetitive switch operating means permanently mounted in and enclosed within said housing and operatively connected to said repetitive switch means to operate said repetitive switch means in a repeating cycle for repetitively rendering said generating means effective to produce at least some of said audible musical tones from said electro-acoustic means in predetermined sequence, means interconnected with said repetitive switch means and extending externally of said housing for manually establishing a predetermined sequence and manually operable switch means for selectively rendering said generating means effective to produce any of said audible musical tones from said electro-acoustic means independent of said repetitive switch means, said manually operable switch means having portions extending externally of said housing.

5. An electronic musical device for producing a rhythm accompaniment or the like comprising a housing, a plurality of electronic generating means in said housing for electronically generating a plurality of characteristically different electric oscillations respectively corresponding to musical tones of different character and each having a keying connection, said electronic generating means normally being biased for non-operability and respectively rendered operative by grounding of said keying connection, electro-acoustic translating means interconnected with said generating means for converting said oscillations into a plurality of different audible musical tones, repetitive switch means in said housing interconnected with said generating means and comprising a plurality of fixed contact means in said housing relatively connected to said keying connections means within said housing sequentially moving from one of said contact means to another for repetitively rendering said generating means effective to produce different audible musical tones from said electro-acoustic translating means in predetermined sequence, and means permanently mounted in said housing and extending therefrom for varying the rate of movement of said grounded means.

6. An electronic musical device as set forth in claim 5 and including manually operable switch means including means extending externally of said housing for variably connecting said fixed contact means and said tone generating means for predetermining the sequence of production of audible musical tones.

7. An electronic musical device for producing rhythm accompaniment or the like comprising a housing, a plurality of electronic generating means in said housing for generating a plurality of respectively different electric oscillations respectively corresponding to a plurality of musical tones of different character, electro-acoustic translating means interconnected with said generating means for converting said oscillations into audible musical tones, repetitive switch means permanently mounted in and enclosed by said housing, said switch means being interconnected with said generating means and comprising a plurality of electrically independent fixed contacts and a movable contact mechanically moving in sequence from one to another of said contacts, and means for selectively connecting any and all of said fixed contacts to said generating means for rendering said generating means effective upon movement of said movable contact to produce a plurality of different musical tones from said electro-acoustic translating means in predetermined sequence.

8. An electronic musical device as set forth in claim 7 wherein the fixed contacts are arranged in a plurality of concentric arcs, and wherein the movable contact means comprises an arm rotatably sweeping past said contacts in sequence, said arm being simultaneously engageable with a plurality of said fixed contacts.

9. An electronic musical device as set forth in claim 7 and further including a plurality of individually manually operative switch means mounted in and extending from said housing respectively interconnected with said generating means for selectively rendering said generating means effective to produce audible musical tones from said electro-acoustic means independently of the repetitive switch means.

10. An electronic musical device for producing a rhythm accompaniment or the like comprising a housing, a plurality of electronic generating means in said housing for electronically generating a plurality of characteristically different electric oscillations corresponding to a plurality of musical tones of different character, electro-acoustic translating means interconnected with said generating means for converting said oscillations into audible musical tones, repetitive switch means in said housing and repetitive switch operating means permanently mounted in and enclosed within said housing and interconnected with said generating means, for operating said repetitive switch means in predetermined sequence, comprising a plurality of electrically independent fixed contacts and movable contact means sequentially engageable with said fixed contacts for repetitively rendering said generating means effective to produce audible musical tones from said electro-acoustic means in sequence, manually operable means for differently connecting said electrically independent fixed contacts to said generating means whereby to vary said sequence, and means for electrically isolating said manually operable means from said repetitive switch means.

11. An electronic musical device for producing a rhythm accompaniment or the like comprising a housing, a plurality of electronic generating means in said housing for electronically generating a plurality of characteristically different electric oscillations corresponding to a plurality of musical tones of different character, electro-acoustic translating means interconnected with said generating means for converting said oscillations into a plurality of different audible musical tones, repetitive switch means permanently mounting in said housing and interconnected with said generating means and including a plurality of arcuately spaced fixed switch contacts and a rotatable sweep arm sequentially engageable therewith for repetitively rendering said generating means effective to produce audible musical tones from said electro-acoustic means in sequence, and means in said housing for driving said arm at a variable speed.

12. An electronic musical device as set forth in claim 11 wherein the variable speed drive means comprises a rotatable disc fixed for coaxial rotation with said arm and having a face thereon, a drive wheel engaging said face, means for positioning said drive wheel on said face at continuously varying distances radially thereof comprising an arm pivotally mounted adjacent one end and carrying said drive wheel pivotally intermediate the ends of said arm and means for moving the opposite end of said arm, and means for driving said drive wheel.

13. An electronic musical device for producing a rhythm accompaniment or the like comprising a plurality of electronic generating means for electronically generating a plurality of characteristically different electric oscillations corresponding to a plurality of musical tones of different character, a like plurality of keying connections respectively connected to said plurality of electronic generating means for selectively rendering said generating means operative, a like plurality of manually operable switches respectively connected to said keying connections for manually selectively operating said generating means, a like plurality of electrical collectors, a like plurality of ganged switches respectively connecting said collectors with said keying connections, means for simultaneously opening and for simultaneously closing all of said ganged switches, electro-acoustic translating means interconnected with said generating means for converting the oscillations generated thereby into audible musical tones, a plurality of fixed switch contacts, means for selectively interconnecting said switch contacts with said electrical collectors, and sweep contact means sequentially engageable with said plurality of fixed switch contacts for sequentially rendering said generating means effective to produce a predetermined sequence of different audible musical tones from said electro-acoustic translating means.

14. An electronic musical device as set forth in claim 13 wherein the means for closing and opening the ganged switches comprises an electro-mechanical operator.

15. An electronic musical device for producing a rhythm accompaniment or the like comprising a plurality of electronic generating means for electronically generating a plurality of characteristically different electric oscillations corresponding to a plurality of musical tones of different character, a like plurality of keying connections respectively connected to said plurality of electronic generating means for selectively rendering said generating means operative, a like plurality of manually operable switches respectively connected to said keying connections for manually selectively operating said generating means, a like plurality of electrical collectors, means respectively connecting said collectors to said keying connections, electro-acoustic translating means interconnected with said generating means for converting the oscillations generated thereby into audible musical tones, a plurality of electrically isolated switch contacts, a plurality of discrete electrical means for selectively connecting said electrically isolated switch contacts to said collectors, at least some of said collectors each having a plurality of said electrically isolated contacts connected thereto, and sweep contact means sequentially engageable with said plurality of fixed switch contacts for sequentially rendering said generating means effective to produce a predetermined sequence of different audible musical tones from said electro-acoustic translating means.

References Cited by the Examiner

UNITED STATES PATENTS

| | | | |
|---|---|---|---|
| 1,261,175 | 4/18 | Steinert | 84—3 |
| 1,271,590 | 7/18 | Lefever | 74—194 |
| 1,322,795 | 11/19 | Kent | 84—3 |
| 2,562,670 | 7/51 | Koehl | 84—1.11 |
| 2,641,897 | 6/53 | Maas | 84—107 X |
| 2,708,337 | 5/55 | Leach. | |
| 2,791,146 | 5/57 | Kunz | 84—1.03 X |
| 2,888,850 | 6/59 | Markowitz | 84—1.01 |
| 2,924,784 | 2/60 | Peterson | 84—1.01 |

ARTHUR GAUSS, *Primary Examiner.*

LAURENCE V. EFNER, *Examiner.*